(12) United States Patent
Rao et al.

(10) Patent No.: US 7,991,753 B2
(45) Date of Patent: Aug. 2, 2011

(54) LOCK ACQUISITION AMONG NODES OF DIVIDED CLUSTER

(75) Inventors: Sudhir G. Rao, Portland, OR (US); Myung M. Bae, Pleasant Valley, NY (US); Thomas K. Clark, Gresham, OR (US); Douglas Griffith, Apex, NC (US); Roger L. Haskin, Morgan Hill, CA (US); Shah Mohammad Rezaul Islam, Tucson, AZ (US); Felipe Knop, Lagrangeville, NY (US); Soumitra Sarkar, Cary, NC (US); Frank B. Schmuck, Campbell, CA (US); Theodore B. Vojnovich, Cary, NC (US); Yi Zhou, Pittsburgh, PA (US); Robert Curran, West Harley, NY (US)

(73) Assignee: International Business Machines Corporation, Armonk, NY (US)

( * ) Notice: Subject to any disclaimer, the term of this patent is extended or adjusted under 35 U.S.C. 154(b) by 2203 days.

(21) Appl. No.: 10/851,812

(22) Filed: May 21, 2004

(65) Prior Publication Data

US 2005/0262143 A1    Nov. 24, 2005

(51) Int. Cl.
*G06F 7/00* (2006.01)

(52) U.S. Cl. ........................................ 707/704; 709/226

(58) Field of Classification Search .......... 709/223–226; 707/613, 704
See application file for complete search history.

(56) References Cited

U.S. PATENT DOCUMENTS

| 5,673,384 A | 9/1997 | Hepner et al. |
| 6,279,032 B1 | 8/2001 | Short et al. |
| 6,314,526 B1 | 11/2001 | Arendt et al. |
| 2003/0078996 A1 | 4/2003 | Baldwin |
| 2005/0010838 A1* | 1/2005 | Davies et al. .................. 714/100 |
| 2005/0015657 A1* | 1/2005 | Sugiura et al. .................... 714/6 |

* cited by examiner

*Primary Examiner* — Ajay Bhatia
*Assistant Examiner* — Loi Tran
(74) *Attorney, Agent, or Firm* — Steve Bennett

(57) ABSTRACT

The acquisition of a lock among nodes of a divided cluster is disclosed. A method is performable by each of at least one node of the cluster. A node waits for a delay corresponding to its identifier. The node asserts intent to acquire the lock by writing its identifier to X and Y variables where another node has failed to acquire the lock. The node waits for another node to acquire the lock where the other node has written to X, and proceeds where Y remains equal to its own identifier. The node waits for another node to acquire the lock where the other node has written to a Z variable, and writes its own identifier to Z and proceeds where the other node has failed. The node writes a value to Y indicating that it is acquiring the lock, and maintains acquisition by periodically writing to Z.

10 Claims, 8 Drawing Sheets

FIG 3
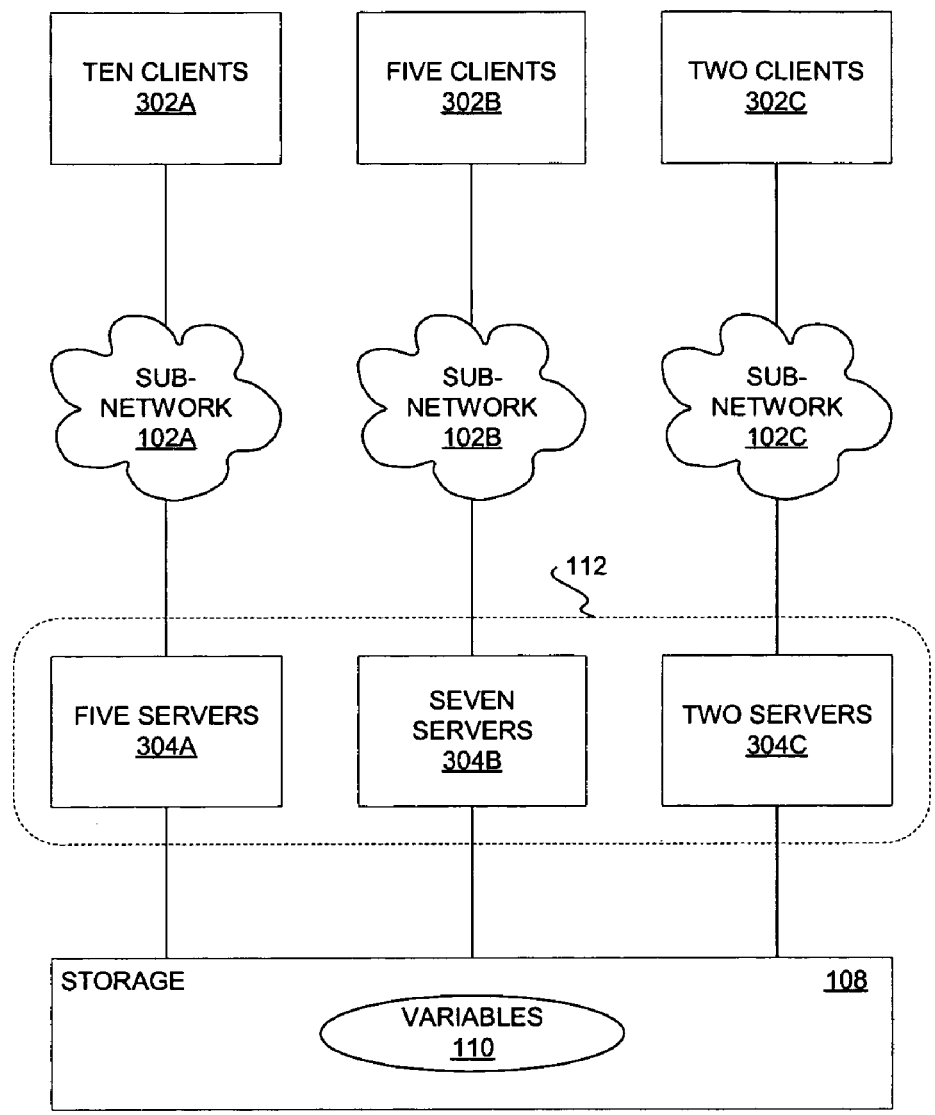
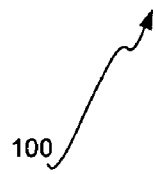

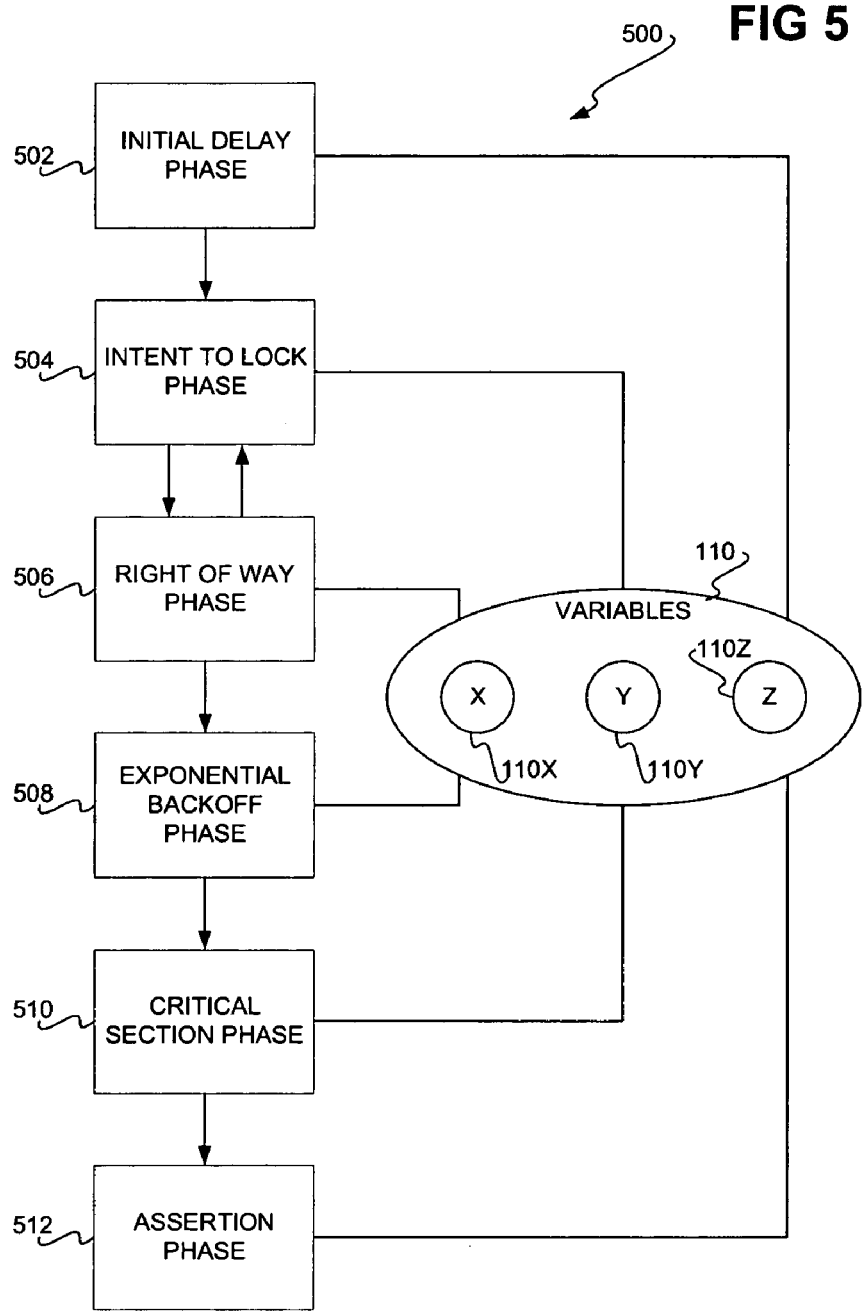

LOCK ACQUISITION AMONG NODES OF DIVIDED CLUSTER

FIELD OF THE INVENTION

The present invention relates generally to divided clusters of nodes, such as server computing devices, and more particularly to protocols to determine which of the nodes of a cluster acquires a lock, signifying leadership of the cluster, when the cluster becomes divided.

BACKGROUND OF THE INVENTION

A common type of network that is deployed in organizations is the client-server network. In a client-server network, there may be a number of client computing devices, or clients, which are typically used by end users of an organization, and a number of server computing devices, or servers, which are computing devices that are shared among the clients, and thus the users. Types of servers can include application servers, file servers, intranet servers, e-mail servers, electronic commerce servers, print servers, proxy servers, and web servers, among other kinds of servers.

To leverage the servers within a network, the servers may work together as a cluster. Clustering generally refers to multiple servers that are linked together in order to handle variable workloads or to provide continued operation in the event one fails. Each server may be a multiprocessor system itself. A cluster of servers can provide fault tolerance, load balancing, or both. Fault tolerance means that if one server fails, one or more additional servers are still available. Load balancing distributes the workload over multiple servers.

In a given cluster of servers, usually one of the servers is assigned or appointed the leader of the cluster. The leader of the cluster may be statically determined a priori by a network administrator, or, as is more common, may be dynamically determined among the servers themselves during startup. In the latter scenario, each of the servers may upon startup determine whether there is a leader of the cluster, and if there is no leader, try to become the leader of the cluster. Once one of the servers has established leadership, the other servers of the cluster stop attempting to acquire leadership.

After startup, however, leadership of a cluster of servers may need to be redetermined. The current leader of the cluster may fail in such a way that it can no longer be the leader. For example, such a server may crash, or its communication link with the other servers may fail. Often a cluster of servers may fail where the servers are undesirably divided, or partitioned, into two or more groups, or partitions, that are unable to communicate with one another. For example, a switch or other type of networking device connecting all the servers of a cluster together may fail in a such a way that the servers are effectively divided, or separated, into two or more such groups.

When a cluster of servers becomes divided into two or more groups that are unable to communicate with one another, leadership of the cluster is usually redetermined. In effect, one of the groups of servers becomes the acting cluster, whereas the servers of the other groups no longer participate in the cluster. The group of servers that becomes the effective, or acting, cluster has one of its servers become the leader of the cluster. Stated another way, the server that becomes the new leader of the cluster effectively causes the cluster to be redefined as those servers that are part of the group of servers that includes the new leader.

Different protocols exist to determine which server becomes the new leader of a cluster when the cluster becomes divided into two or more separate groups. In one common approach, each server sends network messages to the other servers to determine the size of the group, or partition, of which the server is now a part. The servers of the group that includes a majority of the servers of the clusters then send network messages to one another to appoint a new leader of the cluster.

For example, a cluster of ten servers may become divided into one group of four servers and another group of six servers. By communicating with one another, the servers each determine that they are part of either the former group or the latter group. Because the servers know that there were originally ten servers within the cluster, the servers that conclude that they are part of the group of six servers send network messages to one another to appoint a new leader of the cluster. The four servers that are not part of the new acting cluster generally do not perform any further activity or functionality until the fault that resulted in the division of the original cluster is corrected.

However, so-called majority-based network-messaging protocols are not effective in many situations. A cluster of servers may become divided into groups that have the same number of servers. In the previous example, for instance, the cluster of ten servers may instead become divided into two groups of five servers. In such instance, majority-based protocols have no way to determine which group of servers should become the dominant group within the cluster, and thus from which group a leader should be appointed for the cluster. Majority-based protocols are also ineffective for clusters of two servers, since such clusters can inherently be divided only into two groups of a single server apiece.

Majority-based protocols may further be undesirable when the number of servers is not the most important factor in sustaining a divided cluster. For example, a cluster of ten servers may have been responsible for the processing needs of one hundred clients. Where the cluster becomes divided into one group of six servers and another group of four servers, the cluster division may also have resulted in ninety of the clients being connected only to the group of four servers and ten of the clients being connected only to the group of six servers. Assuming that all the clients are of equal importance, it would be undesirable to redefine the cluster as the group of six servers, since this larger group of servers only is able to serve ten clients, whereas the smaller group of four servers is able to serve ninety clients.

Furthermore, prior art non-majority-based, non-network-messaging protocols have their own drawbacks. Such protocols may be storage-based, in that they appoint leaders of clusters by having the servers of a given cluster write to disk sectors of a storage, like a hard disk drive or a storage-area network (SAN). The Small Computer System Interface (SCSI) 2 specification provides for such a storage-based protocol, but it does not ensure persistent locking. Persistent locking means that once a lock corresponding to cluster leadership has been acquired by a given server of node, it is guaranteed to retain the lock unless and until cluster leadership needs to be redetermined. For instance, within the storage-based protocol of the SCSI 2 specification, power cycling of the storage system can cause a loss of lock acquisition by one of the servers within the cluster, even if a new leader for the cluster does not have to be redetermined. By comparison, the SCSI 3 specification provides a storage-based protocol that ensures persistent locking. However, this protocol requires consistent implementation by storage vendors, which does not occur with regularity, and thus is not a mature technology. As such, the protocol can cause problems when heterogeneous SAN-based storages are used that have storage devices from different vendors.

Other prior art storage-based protocols are based on Leslie Lamport's "A Fast Mutual Exclusion Algorithm," as published in the February 1987 issue of the ACM Transactions on Computer Systems. Storage protocols that directly use Lamport's algorithm cannot be employed within the context of storage-area networks (SAN's), limiting their usefulness. These protocols cannot be used within the context of SAN's, because Lamport's mutual exclusion algorithm requires an upper bound on input/output (I/O) reads and writes—that is, an upper bound on the length of time a given read or write will take—whereas SAN's do not provide for such an upper bound.

A limited solution is to use the length of time it takes for a SCSI timeout be the upper bound. A timeout is an intentional ending to an incomplete task. For instance, if a requesting node issues read or a write request to a SCSI hard disk drive, and if confirmation of that request is not received from the SCSI hard disk drive within a given period of time, or "timeout," then the node assumes that the SCSI hard disk drive did not receive or could not complete the given request. By timing out after this given period of time, the requesting node thus does not wait indefinitely for the confirmation of the request from the SCSI hard disk drive. However, SCSI timeouts are usually on the order of thirty seconds, and can vary by hard disk drive vendor, which means that such protocols can take an undesirably long time to select the leader of a cluster.

Other prior art storage-based protocols have adapted Lamport's algorithm for SAN's. One such protocol adapts Lamport's algorithm to use as many sectors of a storage as there are servers, or nodes, in the cluster. This solution does not scale well in terms of storage space used, however, since an inordinately large number of disk sectors, and thus an inordinately large amount of storage space, may be required. Another adaptation uses two sectors as the original Lamport algorithm does, and increases various predetermined delays in the algorithm in which nodes wait for other nodes to acquire the lock on cluster leadership. Such protocols treat these increased delays as disk leases, in which a given node is said to be the current leaseholder of a sector of a disk, and is the only node allowed to write to that sector, while it maintains the disk lease for that disk. However, such adaptations of Lamport's algorithm suffer from the problem of one node overwriting what has been written by another node at the penultimate moment prior to acquiring the lock on the leadership of the cluster, which can result in two nodes each believing that it is the cluster leader. Using larger delays of the order needed by disk leases also requires tuning for every different storage type and SAN configuration.

Furthermore, protocols based on Lamport's mutual exclusion algorithm do not guarantee that a cluster leader will be selected should most of the servers within the cluster fail or crash. Protocols based on Lamport's algorithm also do not provide sustained locking semantics. Sustained locking semantics are semantics, or methodologies or approaches, that a lock-holding server, as the leader of a cluster, is to periodically perform to maintain acquisition of the lock, and thus to sustain its leadership of the cluster. Sustained locking semantics are needed due to the potential of overwriting disk sectors when multiple servers, or nodes, can asynchronously access the sectors of the disks in the same shared storage. Such protocols thus do not force the leader of a cluster to assert and maintain its leadership of the cluster, which is undesirable.

For these and other reasons, therefore, there is a need for the present invention.

SUMMARY OF THE INVENTION

The invention relates to the acquisition of a lock among the nodes of a divided cluster, where the node that acquires the lock may in one embodiment be considered the leader of the cluster. A method of one embodiment of the invention is performable by each of at least one node of a number of nodes of a cluster that may have been divided into two or more groups of nodes that are unable to communicate with one another. A node performing the method initially waits for a delay corresponding to a node identifier of the node, such as to the integral value of the node identifier of the node, which in one embodiment may indicate the priority of the node relative to the other nodes. The node asserts intent to acquire a lock by writing its node identifier to an X variable, and writing its node identifier to a Y variable where another node has failed to acquire the lock.

The node waits for another node to acquire the lock where the other node has written to the X variable, and proceeds where the Y variable remains equal to its own node identifier, or where the other node has failed to acquire the lock. The node further waits for another node to acquire the lock where the other node has written to a Z variable, and thereafter writes its own node identifier, as well as a timestamp, to the Z variable and proceeds where the other node has failed to acquire the lock. The node writes a value to the Y variable indicating that it is acquiring the lock, and maintains acquisition of the lock by periodically writing its node identifier and a timestamp to the Z variable.

A method of another embodiment of the invention is also performable by each of at least one node of a number of nodes of a divided cluster. The method repeats the following loop. A value of a Z variable is determined. Where the value of the Z variable is equal to the node identifier of another node, and where the other node has acquired a lock on the cluster, the loop is exited and the node performing the method has failed to acquire the lock. Where the value of the Z variable is equal to the node identifier of another node, and where the other node has failed to acquire the lock, the node performing the method instead writes its node identifier to the Z variable and waits for a delay before repeating the loop. Where the value of the Z variable is equal to the node identifier of the node performing the method, and another node has failed to acquire the lock, the loop is exited and the node performing the method begins to acquire the lock. A system of one embodiment of the invention includes a cluster of nodes divided into a number of groups, where each group includes at least one of the nodes, and may each have an equal number of nodes. The system includes a storage to which each node has communicative access. The storage stores a number of variables written to by at least some of the nodes in accordance with a storage-based protocol for leadership of the cluster.

The variables include a Y variable to which node identifiers of the nodes are stored by the nodes asserting intent to acquire leadership of the cluster, and which is examined to determine whether the nodes should wait to allow another node to acquire leadership of the cluster instead. The variables include a Z variable to which node identifiers are first stored by the nodes to begin acquiring leadership of the cluster, and which are subsequently stored by the node that has acquired leadership of the cluster to maintain leadership. The variables also include an X variable to which node identifiers are stored by the nodes asserting intent to acquire leadership of the cluster, and which is examined to determine whether the nodes should wait to allow another node to have a better chance of acquiring leadership of the cluster instead.

A server computing device of an embodiment of the invention includes a network communication mechanism, a processor, and a computer-readable medium. The network communication mechanism permits the server to communicate with first servers of a cluster, but where the server is unable to communicate with second servers of a cluster, as a result of the cluster having been divided. The computer-readable medium has a computer program stored thereon that is executable by the processor. The program performs a storage-based protocol to determine leadership of the cluster by writing to a number of variables accessible throughout the cluster, and without sending node-to-node network messages throughout the cluster.

An article of manufacture includes a computer-readable medium and a means. The means is in the medium. The means is further for performing a storage-based protocol to determine node leadership of a cluster of nodes that has been fragmented into a number of identically populated groups of nodes.

Embodiments of the invention provide for advantages over the prior art. In particular, embodiments of the invention can be employed even when a cluster of servers has been divided into groups that each includes the same number of servers, such as when the cluster includes just two servers. Embodiments of the invention can guarantee a lock holder, or leader of the cluster, and can guarantee at most one lock holder, in part because a storage-based protocol is employed, which means that the servers all have access to a number of variables stored on a storage like a hard disk drive. That is, even if the servers of different groups of the cluster cannot communicate with one another via network messages, due to a network or other fault, all the servers of the cluster can access the variables stored on the storage. At least some embodiments of the invention do not, therefore, employ any type of network-messaging protocol.

The storage-based protocol of embodiments of the invention is further advantageous as compared to other storage-based protocols. For instance, the storage-based protocols of embodiments of the invention can be implemented within the context of any shared storage environment, including storage-area networks (SAN's), whereas non-storage-based protocols cannot, and whereas other storage-based protocols have such limitations as described in the background section. Furthermore, embodiments of the invention presented herein can be used for varying priority-based cluster leadership techniques, in which the servers or nodes have a better change of obtaining leadership of the cluster based on their priorities relative to the priorities of the other servers or nodes.

Embodiments of the invention converge fast, in that a leader of a cluster is determined quickly. The storage-based protocol of embodiments of the invention guarantees selection of a leader of a cluster, so long as at least one server of the cluster survives failure, and also guarantees selection of just one leader of the cluster. Embodiments of the invention provide sustained-locking semantics by having the leader of the cluster to periodically write to the Z variable. The storage-based protocol further provides persistence semantics, in that all the X, Y, and Z variables are persisted to storage in a synchronous manner.

Still other advantages, aspects, and embodiments of the invention will become apparent by reading the detailed description that follows, and by referring to the accompanying drawings.

BRIEF DESCRIPTON OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a diagram of an example of the cluster of servers of FIG. 1 having been undesirably divided, separated, or partitioned into a number of server groups, according to an embodiment of the invention.

FIG. 5 is a flowchart of a phase-by-phase method for implementing a storage-based protocol for obtaining leadership of a cluster by obtaining a lock, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and System

Figure 1:
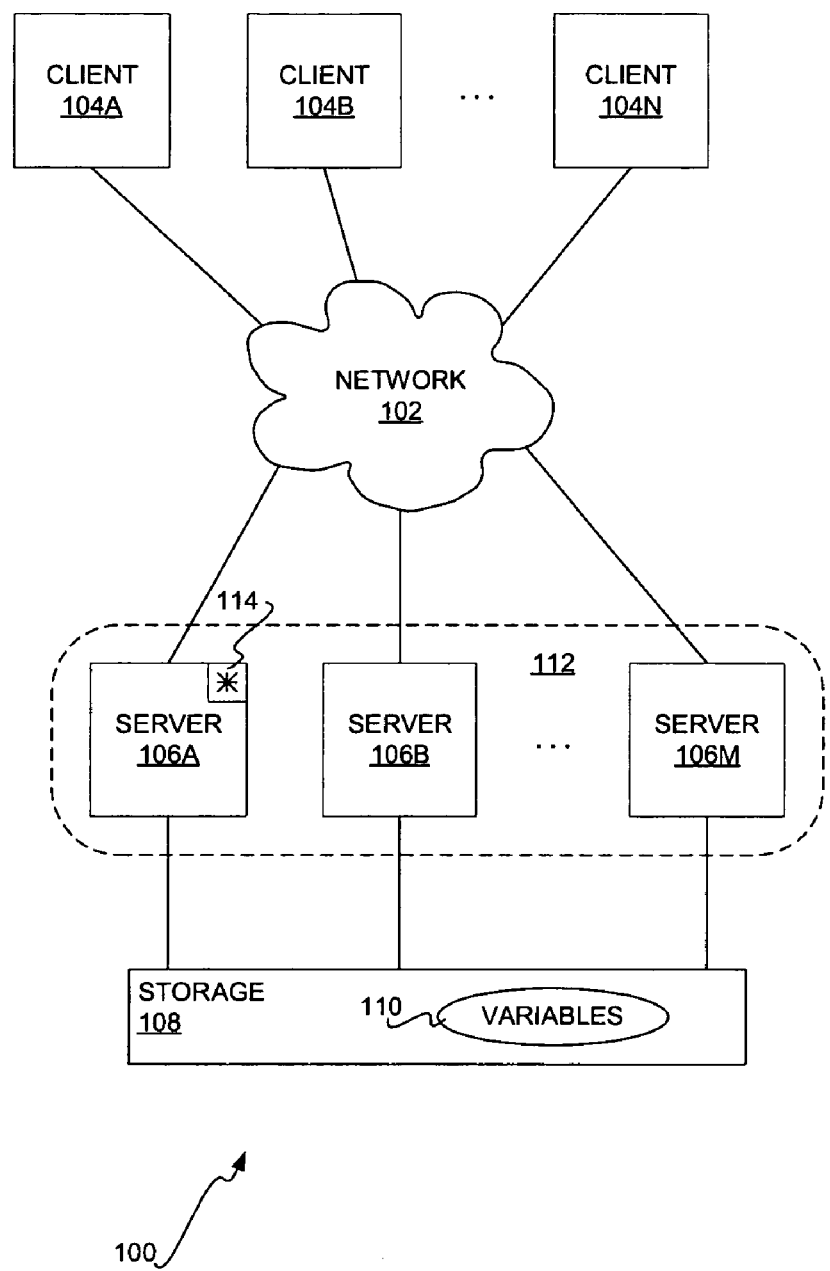
FIG. 1 is a diagram of a system including a cluster of servers, according to an embodiment of the invention.

FIG. 1 shows a system 100 including a cluster 112 of servers 106A, 106B, . . . , 106M, collectively referred to as the servers 106, according to an embodiment of the invention. The system 100 also includes a network 102, a number of clients 104A, 104B, . . . , 104N, and a storage 108. The network 102 may include one or more of: local-area networks (LAN's), wide-area networks (WAN's), intranets, extranets, the Internet, wired networks, wireless networks, and telephony networks, as well as other types of networks. The network 102 enables the clients 104 to communicate with one another, the servers 106 to communicate with one another, and the clients 104 to communicate with the servers 106 and vice-versa.

Each of the clients 104 is more specifically a client computing device, such as a desktop computing device, a laptop or notebook computing device, a personal-digital assistant (PDA) device, a telephony device, or another type of computing device. Each of the servers 106 is more generally a node, where a node may generally and non-restrictively refer to one or more computing devices in one embodiment of the invention. Each of the servers 106 is also more specifically a server computing device. All of the servers 106 are communicatively connected to the storage 108. The storage 108 may be one or more of: a storage-area network (SAN) device, and a hard disk drive, among other types of storage devices.

The servers 106 are organized as the cluster 112. Clustering generally refers to the servers 106 being linked together in order to handle variable workloads for the clients 104 or to provide continued operation in the event one fails. The cluster 112 can provide fault tolerance, load balancing, or both. Fault tolerance means that if one of the servers 106 fails, one or more additional of the servers 106 are still available. Load balancing distributes the workload over the servers 106.

The storage 108 stores a number of variables 110. The variables 110 are writable and readable by each of the servers 106. The variables 110 may be stored on different sectors of the storage 108. When leadership of the cluster 112 of the servers 106 needs to be determined, writing to and reading from the variables 110 allows the servers 106 to perform a storage-based protocol to determine leadership of the cluster 112, by acquiring a lock. The lock may thus be considered a lock on the leadership of the cluster 112, where when one of the servers 106 acquires the lock, the server in question becomes the leader of the cluster 112, and leadership cannot be assumed by any of the other of the servers 106 unless the leader server loses or relinquishes the lock, such as resultant of a fault within the system 100.

The protocol to determine leadership of the cluster 112 is a storage-based protocol in that in at least some embodiments of the invention, leadership is determined by various of the servers 106 reading from and writing to the variables 110 stored on the storage 108, as opposed to, for instance, by sending network messages among the servers 106 over the network 102. Therefore, even if the network 102 partially or completely fails, the servers 106 are able to determine a leader of the cluster 112. As an example, the initial leader of the cluster 112 in FIG. 1 is the server 106A, due to its possession of the lock 114. The storage-based protocol employed to determine leadership of the cluster 112 is more specifically described in later sections of the detailed description.

The leader of the cluster 112 provides administrative and other functionality for the cluster 112. For example, when a data processing request or command is received from one of the clients 104, the leader of the cluster 112 may determine which of the servers 106 is to perform or process this request or command. The leader of the cluster 112 may also be responsible for returning the results of such processing to the requesting one of the clients 104 in one embodiment of the invention. The leader of the cluster 112 may further be responsible for segmenting the memory, storage, and/or other resources of the servers 106 among the servers 106.

Figure 2:
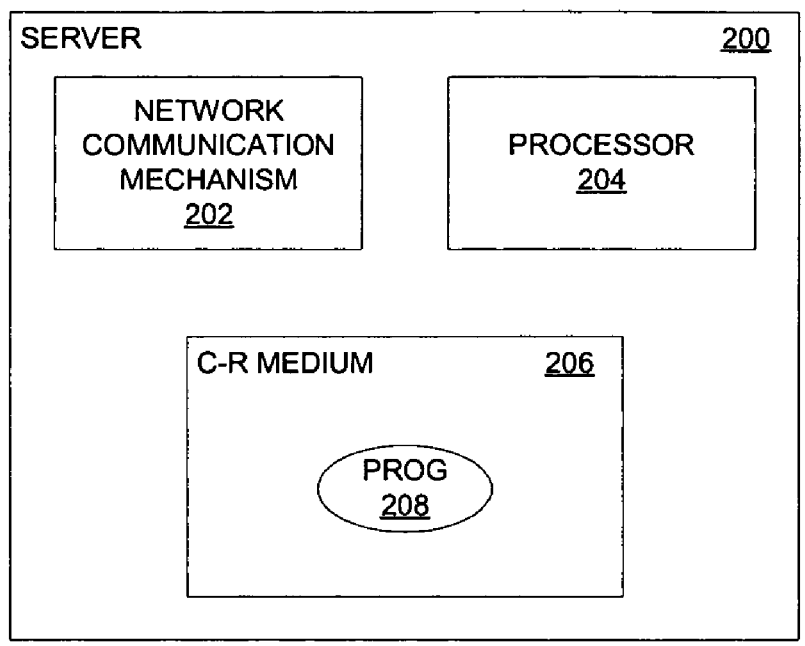
FIG. 2 is a block diagram of a representative server computing device that may implement any or all of the servers of FIG. 1, according to an embodiment of the invention.

FIG. 2 shows a representative server 200 that may implement any or all of the servers 106 of FIG. 1, according to an embodiment of the invention. The server 200 is specifically depicted in FIG. 2 as including a network communication mechanism 202, a processor 204, and a computer-readable medium 206. However, as can be appreciated by those of ordinary skill within the art, the server 200 may include other components in addition to and/or in lieu of those depicted in FIG. 2.

The network communication mechanism 202 permits the server 200 to communicate with other servers over a network, such as the network 102 of FIG. 1. For instance, the network communication mechanism 202 may be or include a network adapter. The processor 204 may include one or more processors that are able to execute commands and instructions to achieve desired functionality. The computer-readable medium 206 may be or include semiconductor memory, optical media, magnetic media, volatile media, and/or non-volatile media. The medium 206 is specifically depicted in FIG. 2 as storing a computer program 208 that is executable by the processor 204. The computer program 208 when executed performs a storage-based protocol to determine leadership of a cluster of servers of which the server 200 is a part, as has been described, and as is described in more detail in later sections of the detailed description.

FIG. 3 shows an example of the system 100 where the cluster 112 has been undesirably separated, divided, or partitioned into three server groups 304A, 304B, and 304C, collectively referred to as the server groups 304. In particular, the network 102 has developed a fault, and has separated into three sub-networks 102A, 102B, and 102C, collectively referred to as the sub-networks 102. The devices connected to any of the sub-networks 102 can communicate with other devices connected to the same sub-network, but not with the devices connected to the other of the sub-networks 102. For example, the devices communicatively connected to the sub-network 102A can communicate with one another, but not with the devices communicatively connected to the sub-network 102B or the sub-network 102C.

The clients 104 of FIG. 1 thus have been divided into three client groups 302A, 302B, and 302C, collectively referred to as the client groups 302, depending on to which of the sub-networks 102 the clients 104 remain connected. As one example, the client group 302A includes ten of the clients 104, the client group 302B includes five of the clients 104, and the client group 302C includes two of the clients 104. Likewise, the servers 106 of FIG. 1 of the cluster 112 have been divided into the three server groups 304. As another example, the server group 304A includes five of the servers 106, the server group 304B includes seven of the servers 106, and the server group 304C includes two of the servers 106. All of the servers, however, remain communicatively connected to the storage 108, and thus can still access the variables 110.

Once the servers within the server groups 304 have become informed or otherwise realize that a fault has developed within the system 100 such that all of the servers within the cluster 112 can no longer communicate with one another, one or more of the servers perform the storage-based protocol to determine which of the servers should become the new leader of the cluster 112. The cluster 112 becomes redefined based on which of the servers becomes the new leader of the cluster 112. If one of the servers of the group 304A becomes the leader of the cluster 112, then the cluster 112 is redefined to include just the servers of the group 304A. If one of the servers of the group 304B becomes the leader of the cluster 112, then the cluster 112 is redefined to include just the servers of the group 304B. If one of the servers of the group 304C becomes the leader of the cluster 112, then the cluster 112 is redefined to include just the servers of the group 304C. The servers of the other groups 304A and 304B do not perform in any activity or functionality with respect to the newly redefined cluster 112, until the fault that resulted in the original cluster 112 becoming divided is corrected.

Furthermore, unlike a majority-based protocol, the storage-based protocol of embodiments of the invention does not necessarily require that the new leader of the cluster 112 be selected from the server group of the group 304 that includes the most servers. That is, in the case of the example of FIG. 3, the storage-based protocol does not necessarily require that the new leader of the cluster 112 be selected from the server group 304B, which includes the most servers, seven, of any of the groups 304. For example, because the most clients are connected to the sub-network 102A, the ten clients of the client group 302A, the storage-based protocol may instead weigh in favor of having the leader of the cluster 112 selected from the server group 304A.

Figure 4A:
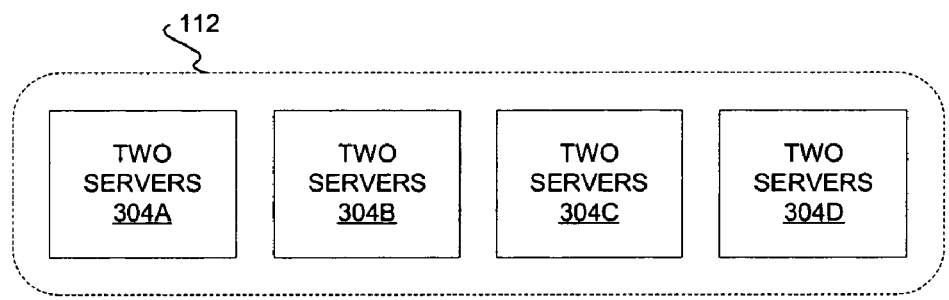
FIGS. 4A and 4B are diagrams of further examples of the cluster of servers of FIG. 1 having been undesirably divided into a number of server groups, according to varying embodiments of the invention.
Figure 4B:
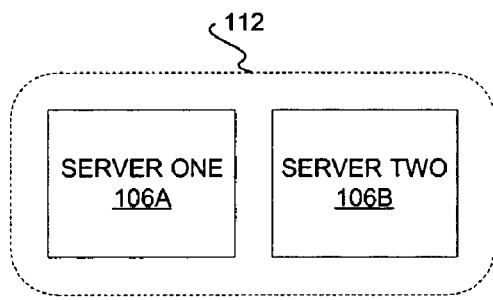

FIGS. 4A and 4B show additional examples of the manner by which the cluster 112 may be divided into different server groups, where the storage-based protocol is still effective in selecting a new leader of the cluster 112, according to varying embodiments of the invention. The clients 104, the network 102, and the storage 108 of FIG. 1 are not depicted in FIGS. 4A and 4B for illustrative convenience. In FIG. 4A, the servers 106 of FIG. 1 of the cluster 112 have been divided into four server groups 304A, 304B, 304C, and 304D, collectively referred to as the server groups 304. Each of the server groups 304 includes two of the servers 106. That is, the server groups 304 are each populated with the same number of servers. In FIG. 4B, there are two servers 106A and 106B that make up the cluster 112. Where the cluster 112 is divided into two server groups, each including one of the servers 106A and 106B, the server groups are also each populated with the same number of servers. In this example, the cluster 112 originally includes two servers.

The storage-based protocol of embodiments of the invention is able to select a leader of the cluster 112 in either the example of FIG. 4A or the example of FIG. 4B, even though the server groups in each of FIGS. 4A and 4B each encompass the same number of servers. In this way, the storage-based protocol is advantageous over majority-based protocols that require a clear majority in one of the server groups in order to select a new leader of a cluster of servers. Furthermore, although FIGS. 3, 4A, and 4B depict specific examples of the number of server groups and the number of servers within each server group, as a result of division of the cluster 112, other embodiments of the invention are not so limited. That is, the storage-based protocol of embodiments of the invention, as is specifically described in later sections of the detailed description, is able to select a new leader of the cluster 112 regardless of the number of server groups within the cluster 112 that cannot communicate with one another and regardless of the number of servers within each server group.

Storage-Based Protocol

FIG. 5 shows a phase-by-phase method 500 for implementing the storage-based protocol for obtaining leadership of the cluster 112 of FIG. 1, according to an embodiment of the invention. In each of the phases, either read or write access is made to one of the variables 110, which includes the variables 110X, 110Y, and 110Z. The variable 110X may also be referred to as the X variable, the variable 110Y may also be referred to as the Y variable, and the variable 110Z may also be referred to as the Z variable. It is noted that the indication of the variables 110X, 110Y, and 110Z, both in the specification and in the claims, as the X, Y, and Z variables, is accomplished solely to differentiate among the different variables. That is, no other implication or inference is to be made by referring to the variables as the X, Y, and Z variables. In addition, the phase-by-phase method 500 is described substantially in the context where the identifier of a server or node is indicative of its priority relative to that of the other servers or nodes. However, in other embodiments of the invention, the method 500 may be employed relative to the priorities of servers or nodes that are not necessarily their identifiers.

The method 500 progresses from one phase to a subsequent phase, except that the method 500 may return from the phase 506 to the phase 504. In addition, at any of the phases 502, 504, 506, 508, and 512, the method 500 may exit, or finish, which is not particularly reflected in FIG. 5 for illustrative convenience. It is noted that upon exit, a server performing the method 500 may at a later time return to the phase 502 if or when leadership of the cluster 112 needs to be redetermined. If all the phases 502, 504, 506, 508, 510, and 512 are performed by a given server, this server is said to have obtained a lock on leadership of the cluster 112, such that it is the new leader of the cluster 112.

The method 500 is particularly performed by each server of the servers 106 of FIG. 1 that is to attempt to obtain leadership of the cluster 112 where the cluster 112 has been divided, separated, or partitioned into a number of groups as shown in FIGS. 3, 4A and 4B. That is, in some embodiments of the invention, not necessarily all of the servers 106 will perform the method 500. The method 500 is described in relation to just one server that is performing the method 500, which is referred to as the server that is performing the method 500. Furthermore, each server is said to have an identifier, which is used when performing the method 500. The identifiers may in one embodiment be an arbitrary numbering of the servers 106, and can be an indication of the priorities of the servers 106, as is described in more detail in a later section of the detailed description. For instance, the identifiers may have integral values that correspond to the priorities of the servers 106. If the identifiers themselves do not indicate the priorities of the servers 106, then the priorities of the servers 106 may be determined based on other characteristics of the servers 106. The identifiers are unique, although the priorities of the servers 106 are not necessarily unique, such that no two servers performing the method 500 have the same identifier. In one embodiment of the present invention, the identifiers are numerical.

The phases of the method 500 are first each summarily described, and then certain of the phases are described in more detail. In the initial delay phase 502, the server performing the method 500 waits for a time period that is a function of its identifier, and then determines whether another server that is performing the method 500 has already obtained the lock. If so, then the method 500 is finished for the server in question. To determine whether another server has already obtained the lock, the variable 110Z is examined for successive so-called heartbeats of this other server. That is, a server that has the lock periodically writes its server identifier and a timestamp to the variable 110Z, where such writing is referred to as a heartbeat of the server. The variable 110Z can be specifically considered as the variable to which server identifiers and timestamps are first stored by a server beginning acquisition of leadership of the cluster, and to which server identifiers and timestamps are subsequently periodically stored by the server that has acquired leadership of the cluster and is thus maintaining such leadership.

The phase 502 is performed in one embodiment of the invention by performing a test-lock function with the parameters priority, identifier, and delay. The test-lock function returns true if two distinct heartbeats of another server are detected, where there is a determined delay in checking for the second heartbeat after the first heartbeat has been detected. In the case of the phase 502 in particular, the delay is determined as two times the identifier, or priority where the identifier does not indicate the priority, of the server performing the method 500, times a constant D, and is inversely proportional to the priority of the server. This delay is referred to as a skewed delay. By comparison, the test-lock function may also be performed with an unskewed delay, in which the delay is determined as two times the constant D. The constant D is preferably equal to the interval between heartbeats of the server that ultimately becomes the leader of the cluster, as is described in more detail later in the detailed description. Thus, a skewed delay increases the delay by a multiple equal to the identifier of the server, whereas an unskewed delay does not so increase the delay. The phase 502 may also or alternatively be referred to as waiting for a delay corresponding to the identifier of the server performing the method 500.

In the intent-to-lock phase 504, the server performing the method 500 demonstrates, or asserts, an intent to acquire a lock on the leadership of the cluster, by particularly writing its identifier to the variable 110X. The server stays in the phase 504 as long as the variable 110Y moves from a valid server identifier to an invalid server identifier, such as the value −1 (or another value that is known not to actually identify one of the servers). The invalid server identifier indicates that the lock has already been acquired by another server, and for a certain number of times, or retries, in examining the variable 110Y. The number of retries allows the server performing the method 500 to still claim the lock if heartbeats are not properly written to by another server in the process of acquiring the lock. If the lock has been acquired by another server, which is determined via the test-lock function that has been described, then the method 500 is finished as to the server performing the method 500. If another sever has not acquired the lock, however, then the server performing the method 500 also writes its identifier to the variable 110Y, before proceeding to the phase 506. The phase 504 may also or alternatively be referred to as asserting an intent to acquire the lock by writing the identifier of the server performing the method 500 to the variables 110X and 110Y.

In the right-of-way phase 506, the server performing the method 500 waits for another server to acquire the lock where the other server has written to the variable 110X (e.g., where the server performing the method 500 may have previously written to the variable 110X in the phase 504 before the other server has written to the variable 110X), and where the identifier of the server written to the variable 110X is lower in one embodiment than the identifier of the server performing the method 500. This delay allows the server with the lower identifier to more quickly progress to lock acquisition, increasing performance of the storage-based protocol of the method 500. Similarly, if another server with a lower identifier than the identifier of the server performing the method 500 has written to the variable 110Y, the server performing the method 500 returns to the intent-to-lock phase 504, to allow this other server with the lower identifier to more quickly progress to lock acquisition.

Where the variable 110Y remains greater than or equal to the identifier of the server performing the method 500, or where another server has not yet acquired the lock, then the server performing the method 500 advances to the exponential backoff phase 508. As before, if another server has already acquired the lock, then the method 500 is finished as to the server performing the method 500. The phase 506 may also or alternatively be referred to as waiting for another server to acquire the lock where the other server has written to the variable 110X, and proceeding where the variable 110Y remains greater than or equal to the server identifier of the server performing the method 500, or where the other server has failed to acquire the lock.

In the exponential backoff phase 508, the server performing the method 500 waits for an exponential delay if another server has already written to the variable 110Z, where the exponential delay is a function of the identifier of the server performing the method 500, and is greater than two times the constant D. This delay allows servers with lower identifiers to more quickly acquire the lock on the leadership of the cluster, by giving these servers sufficient time to write two successive heartbeats to the variable 110Z. Once and if two such heartbeats have been detected by the server performing the method 500, then the method 500 is finished as to this server. Otherwise, the server performing the method 500 writes its identifier to the variable 110Z, and, if its identifier is not overwritten within the variable 110Z, the server then advances to the critical section phase 510. The phase 508 may also or alternatively be referred to as waiting for another server to acquire the lock where this other server has written to the variable 110Z, and thereafter proceeding where the other server has failed to acquire the lock. The server with the lower identifier, or priority, reads and writes at intervals of two times the constant D, whereas servers with higher identifiers, or priorities, do so at larger exponential intervals.

In the critical section phase 510, the server performing the method 500 indicates that it is now beginning to acquire the lock on the leadership of the cluster. The server in particular writes a value to the variable 110Y that is not equal to the identifier of any of the servers. For instance, the server may write a value of −1 to the variable 110Y. The server also starts writing heartbeats to the variable 110Z; that is, the server starts writing its server identifier and timestamps to the variable 110Z at regular intervals equal to the constant D. The phase 510 may also or alternatively be referred to as writing the identifier of the server performing the method 500 to the variable 110Z and writing a value to the variable 110Y indicating that this server is acquiring the lock.

Finally, in the assertion phase 512, the server performing the method 500 checks for one last time whether another server has written to the variable 110Z or has acquired the lock on the leadership of the cluster. If so, the method 500 is finished as to the server performing the method 500. Otherwise, the server performing the method 500 continues to assert heartbeats to the variable 110Z at regular intervals to maintain its acquisition of the lock on the leadership of the cluster. The constant D is preferably equal to the interval between heartbeats, and can be configurable in one embodiment of the invention to optimize performance of the method 500, based on the number of servers within the system, the type and servers within the system, and so on. Checking whether another server has acquired the lock may be performed by calling the test-lock function that has been described in conjunction with the initial delay phase 502, without a skewed delay, such that the delay is determined as two times the constant D.

Furthermore, writing periodic heartbeats to the variable 110Z may be accomplished by spawning a separate thread or process on the server performing the method 500. This separate thread or process may write periodic heartbeats to the variable 110Z at an interval equal to the constant D. The separate thread or process may also read the variable 110Z before asserting each heartbeat to verify that it is maintaining leadership of the cluster. The phase 512 may further or alternatively be referred to as maintaining acquisition of the lock by periodically writing the identifier of the server performing the method 500 to the variable 110Z.

Figure 6:
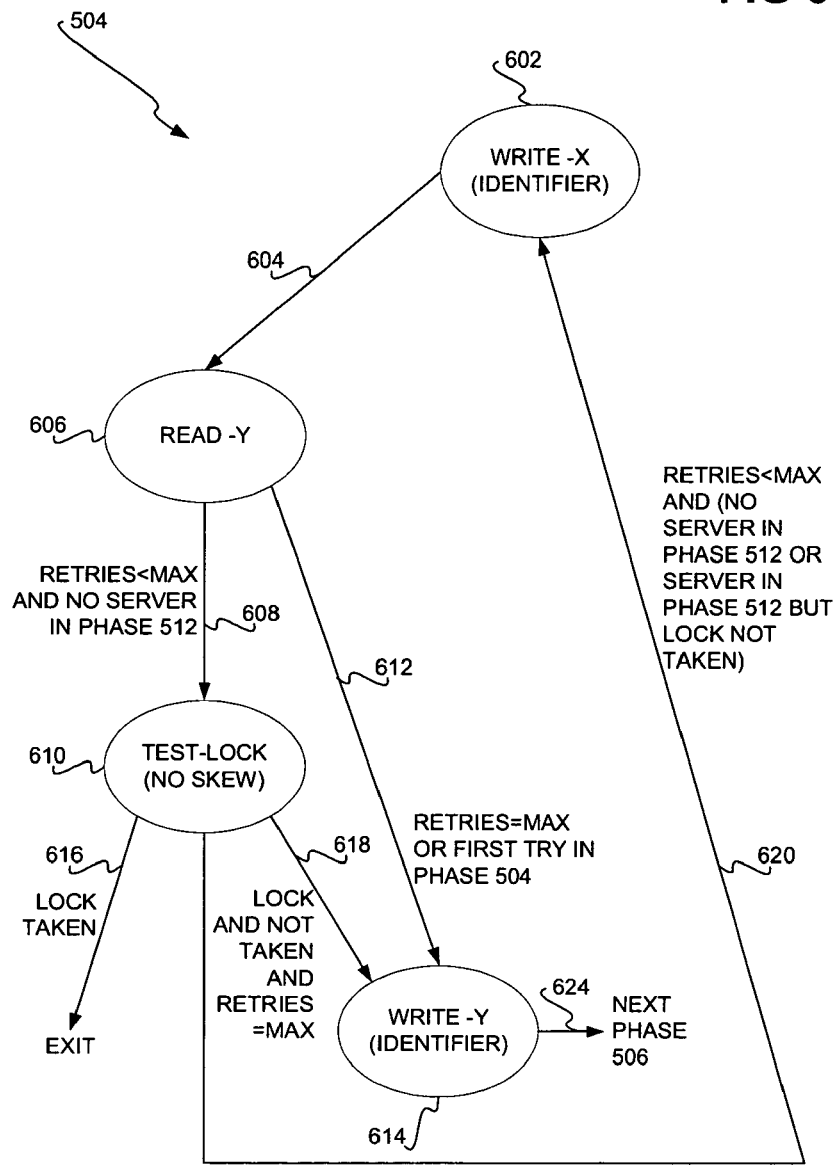
FIG. 6 is a state diagram of the intent-to-lock phase of the method 500 of FIG. 5, according to a particular embodiment of the invention.

FIG. 6 shows a particular implementation of the intent-to-lock phase 504 of the method 500 of FIG. 5, according to an embodiment of the invention. The intent-to-lock phase 504 is specifically depicted in FIG. 6 as a state diagram, having a number of states 602, 606, 610, and 614. The phase 504 starts at the state 602. In the state 602, the identifier of the server performing the method 500 is written to the variable 110X. The phase 504 then progresses from the state 602 to the state 606, as indicated by the arrow 604.

In the state 606, the identifier of the server that is currently stored within the variable 110Y is read, and the phase 504 progresses either to the state 610, as indicated by the arrow 608, or to the state 614, as indicated by the arrow 612. If the number of times, or retries, the variable 110Y has been read is less than a predetermined maximum value, and there is no server currently in the assertion phase 512 of FIG. 5, then the phase 504 progresses from the state 606 to the state 610, as indicated by the arrow 608. Otherwise, if the number of times, or retries, the variable 110Y has been read is equal to the predetermined maximum value, or the variable 110Y has just been read the first time, then the phase 504 progresses from the state 606 to the state 614, as indicated by the arrow 612. It is noted that the variable 110Y having been read the first time means that the server performing the method 500 has entered the state 606 once so far, such that it has read the variable 110Y once with respect to the phase 504.

Furthermore, it is noted that the progression from the state 606 to the state 610, as indicated by the arrow 608, has precedence over the progression from the state 606 to the state 614, as indicated by the arrow 612. That is, if the number of times, or retries, the variable 110Y has been read is less than a predetermined maximum value, and there is no server currently in the assertion phase 512 of FIG. 5, then the phase 504 always progresses from the state 606 to the state 610, as indicated by the arrow 608. That is, even if the variable 110Y has been read for the first time, if there is no server currently in the assertion phase 512 of FIG. 5, then the phase 504 progresses from the state 606 to the state 610. The predetermined maximum value may be equal to a length of time that exceeds a timeout value for a server when writing to any of the variables 110, plus the constant D.

As has been noted, a timeout is an intentional ending to an incomplete task. For instance, if the server writes to one of the variables 110, and if confirmation of that write has not been returned within a given period of time, or "timeout," then the server assumes that the write has not been completed. By timing out after this given period of time, the server thus does not wait indefinitely for the confirmation.

In the state 610, the test-lock function that has been described in conjunction with the initial delay phase 502 is performed, without a skewed delay, such that the delay is two times the constant D. If the result of calling the test-lock function is that the lock has been taken by another server, then the method 500 is exited, as indicated by the arrow 616. The server performing the method 500, after exiting the method 500, may reenter the method 500 at a later time to determine if the lock on the leadership of the cluster 112 is still taken. However, if the lock has not been taken by another server, and the number of retries is equal to the predetermined maximum value, then the phase 504 progresses from the state 610 to the state 614, as indicated by the arrow 618.

Furthermore, if the number of times the variable 110Y has been read is less than the predetermined maximum value, and either there is no server currently in the assertion phase 512 of FIG. 5 or there is a server currently in the assertion phase 512 of FIG. 5 but it has not yet acquired the lock, then phase 504 progresses back from the state 610 to the state 602, as indicated by the arrow 620. In the state 614, which may be reached from the state 606 via the arrow 612 or from the state 610 via the arrow 618, the server performing the method 500 writes its own identifier to the variable 110Y, and the method 500 proceeds to the next phase 506, as indicated by the arrow 624.

Figure 7:
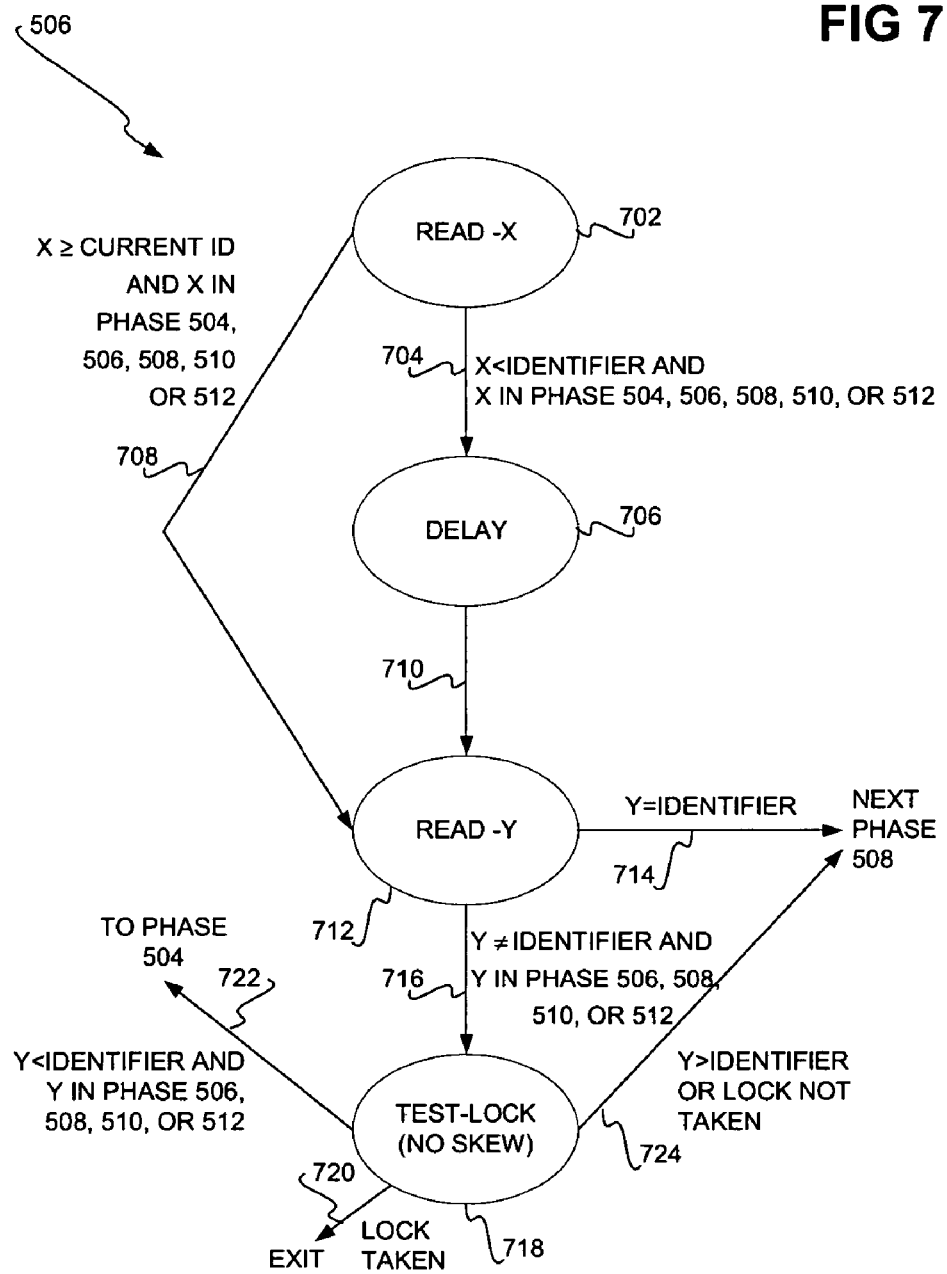
FIG. 7 is a state diagram of the right-of-way phase of the method 500 of FIG. 5, according to a particular embodiment of the invention.

FIG. 7 shows a particular implementation of the right-of-way phase 506 of the method 500 of FIG. 5, according to an embodiment of the invention. The right-of-way phase 506 is specifically depicted in FIG. 7 as a state diagram, having a number of states 702, 706, 712, and 718. The phase 506 starts at the state 702. In the state 702, the variable 110X is read to determine the identifier of the server that most recently has written to the variable 110X. If the value of the variable 110X is less than the identifier of the server performing the method 500, indicating the server identified by the value of the variable 110X could be in phase 504, 506, 508, 510, or 512, then the phase 506 progresses from the state 702 to the state 706, as indicated by the arrow 704. If the value of the variable 110X is greater than or equal to the identifier of the server performing the method 500, and if the server identified by the value of the variable 110X is currently in phase 504, 506, 508, 510, or 512, then the phase 506 progresses from the state 702 to the state 712, as indicated by the arrow 708. It is noted that in one embodiment each server may write its current state and/or phase to the storage 108, so that the servers are able to determine which state and/or phase each server is in while performing the method 500 themselves.

In the state 706, a delay is incurred. The delay may in one embodiment be equal to a constant K1, times the constant D, and the resulting product added to a constant K2. The constants K1 and K2 arbitrary and predetermined, but can be selected so that the resulting total of K1*D+K2 may be the minimum length of time that is needed for a server to start at the phase 504, and progress through and complete the phases 506, 508, 510, and 512, including where a timeout may occur for the server when writing to any of the variables 110. The phase 506 progresses from the state 706 to the state 712, as indicated by the arrow 710.

In the state 712, the value of the variable 110Y is read to determine the identifier of the server that most recently has written to the variable 110Y. If the value of the variable 110Y is equal to the identifier of the server performing the method 500, then the method 500 proceeds from the state 712 to the exponential backoff phase 508, as indicated by the arrow 714. However, if the value of the variable 110Y is not equal to the identifier of the server performing the method 500, and the server identified by the value of the variable 110Y is currently in phase 506, 508, 510, or 512, then the phase 506 progresses from the state 712 to the state 718, as indicated by the arrow 716.

In the state 718, the test-lock function that has been described in conjunction with the initial delay phase 502 is performed, without a skewed delay, such that the delay is two times the constant D. If the result of calling the test-lock function is that the lock has been taken by another server, then the method 500 is exited, as indicated by the arrow 720. If the value of the variable 110Y as previously read is less than the identifier of the server performing the method 500, and the server identified by the value of the variable 110Y is currently in phase 506, 508, 510, or 512, then the method 500 returns back to the intent-to-lock phase 504, as indicated by the arrow 722. If the value of the variable 110Y as previously read is greater than the identifier of the server performing the method 500, or the result of calling the test-lock function is that the lock has not yet been taken by another server, then the method 500 progresses to the exponential backoff phase 508, as indicated by the arrow 724.

Figure 8:
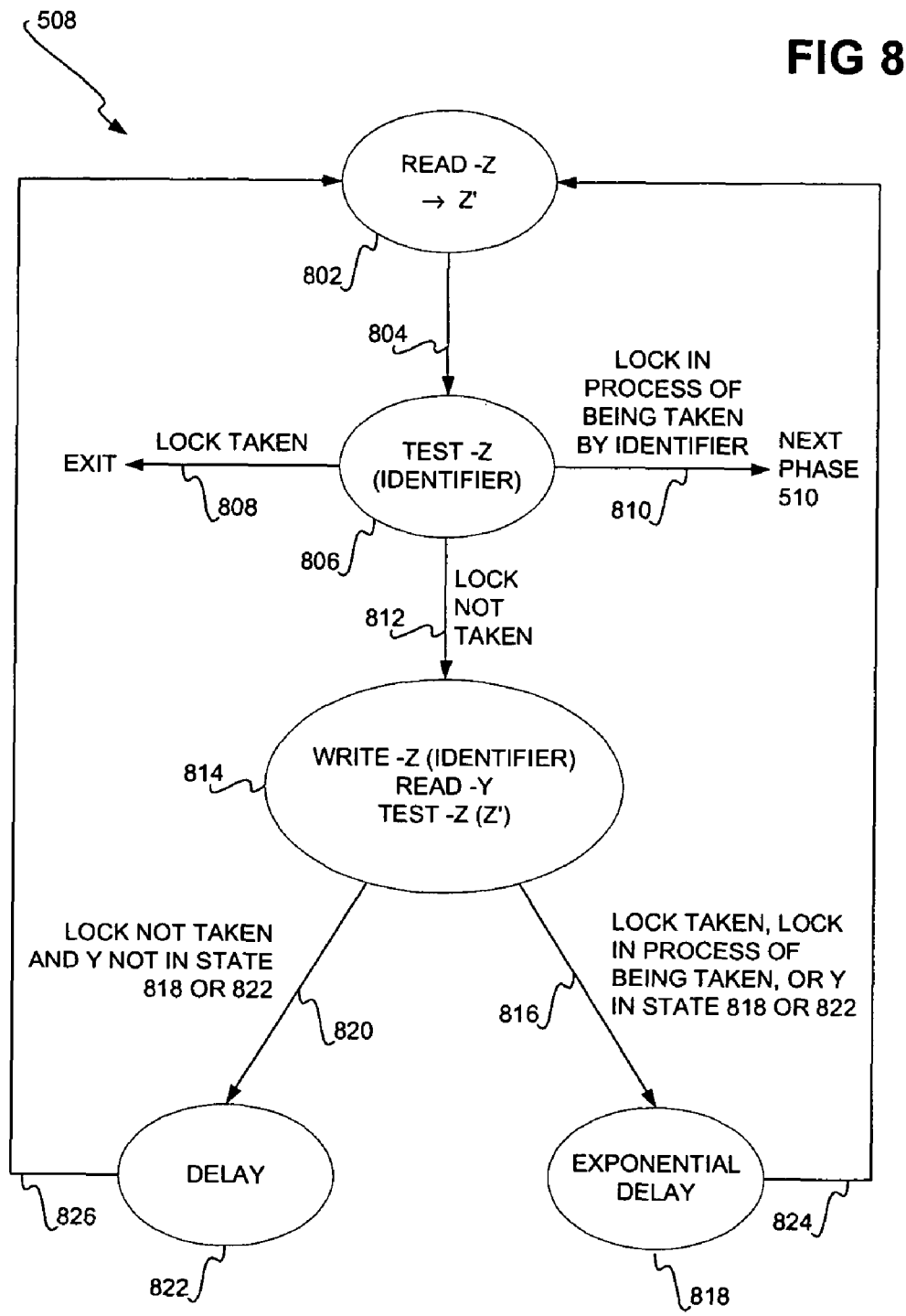
FIG. 8 is a state diagram of the exponential backoff phase of the method 500 of FIG. 5, according to a particular embodiment of the invention.

FIG. 8 shows a particular implementation of the exponential backoff phase 508 of the method 500 of FIG. 5, according to an embodiment of the invention. The exponential backoff phase 508 is specifically depicted in FIG. 8 as a state diagram, having a number of states 802, 806, 814, 818, and 822. The phase 510 starts at the state 802. In the state 802, the variable 110Z is read, and the value thereof is stored in a temporary variable referred to as Z'. The phase 508 progresses from the state 802 to the state 806, as indicated by the arrow 804.

In the state 806, the function test-z is called with respect to the identifier of the server performing the method 500. The function test-z examines the value of the variable against the identifier of the server performing the method 500. If they are the same, a counter corresponding to this identifier is incremented. If the value of the variable is not equal to the identifier of the server performing the method 500, and the timestamp of the variable 110Z is recent, then the counter is decremented. The function test-z returns that the lock is in the process of being taken by the server having the identifier for which the function was called if the counter corresponding to this identifier is greater than or equal to two. Otherwise, the lock has been taken by another server, or has not yet been taken. If the lock has been taken by another server, then the method 500 is finished as to the server performing the method 500, as indicated by the arrow 808. If the lock has not yet been taken by any server, then the phase 508 proceeds from the state 806 to the state 814, as indicated by the arrow 812.

The third arrow extending from the state 806, the arrow 810, corresponds to the situation where the function test-z returns that the lock is in the process of being taken by the server having the identifier for which the function was called. Because the function test-z is called in the state 806 in relation to the identifier of the server performing the method 500, this means that the server performing the method 500 is currently in the process of taking, or acquiring the lock. That is, two consecutive timestamps have been written by the server performing the method 500 to the variable 110Z without any intervening timestamps written to the variable 110Z by another server. To continue the lock acquisition process, the method 500 proceeds to the critical section phase 510, as indicated by the arrow 810.

In the state 814, the server performing the method 500 writes a timestamp and its current identifier to the variable 110Z, reads the variable 110Y, and calls the function test-z in relation to the temporary variable Z'. If the lock for leadership of the cluster has been taken, or is in the process of being taken by the server having its identifier stored in the variable Z' (as tested by the function test-z), or if the server having its identifier stored in the variable 110Y is in state 818 or state 822, then the phase 508 progresses from the state 814 to the state 818, as indicated by the arrow 816. However, if the lock has not been taken (e.g., by the server having its identifier stored in the variable Z') and if the server having its identifier stored in the variable 110Y is not in state 818 or state 822, then the phase 508 progresses from the state 814 to the state 822, as indicated by the arrow 820.

In the state 818, an exponential delay based on the identifier of the server performing the method 500 is incurred. The exponential delay can be equal to the constant D, multiplied by two to the power of (the identifier of the server performing the method 500 plus one), and multiplied by the number of times that the state 806 has been reached thus far by the server performing the method 500. In the state 822, by comparison, a non-exponential delay is incurred. The non-exponential delay can be equal to the constant D times two. From either the state 818 or the state 822, the phase 508 progresses back to the state 802, as indicated by the arrow 824 and the arrow 826.

ALTERNATIVE EMBODIMENTS AND CONCLUSION

In a general embodiment of the invention, the storage-based protocol for determining leadership of a cluster that has become divided is performed by all the nodes of the cluster. However, in alternative embodiments of the invention, the storage-based protocol is performed by only some of the nodes of the cluster. A cluster may be divided, separated, or partition into a number of groups of nodes. Each group of nodes may initially use a disk-based network-messaging protocol, or another type of protocol, to elect which node of the group is to participate in the storage-based protocol for cluster leadership along with the elected nodes of all the other groups. Furthermore, the storage-based protocol that has been described may be used in each of two passes of another approach to determine cluster leadership. For example, the protocol may be performed within each group in a first pass, and the node that acquires the lock for a given group then competes with the nodes that acquired the locks for their own groups for the lock that corresponds to leadership of the cluster as a whole.

In addition, in a general embodiment of the invention, the storage-based protocol for determining leadership of a cluster that has become divided has been described in relation to identifiers for the nodes. The identifiers for the nodes may be an arbitrary numbering of all the nodes within the cluster, where each node is assigned a unique identifier. Alternatively, the identifiers for the nodes may be reassigned after a leader has been elected for the cluster, where the leader is assigned the highest priority, such as the lowest identifier, so that the leader is given a better chance to regain leadership of the cluster should cluster leadership need to be redetermined. Network administrators may further assign the identifiers for the nodes so that certain nodes are more likely to obtain leadership of the cluster versus other nodes.

In another embodiment of the invention, the identifiers for the nodes may correspond to their priorities relative to the other nodes. In one embodiment of the invention, each group of nodes appoints or elects a node to compete with the elected nodes from the other groups for cluster leadership. Each elected node, when performing the storage-based protocol for overall cluster leadership, may then have an identifier corresponding to one or more different factors. The identifier for a node may correspond to the size of the group of nodes from which the node has been elected to compete for cluster leadership, for instance. The identifier for a node may also correspond to the number of clients that are able to communicate with the group of nodes from which the node has been elected, as another example.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. A method performable by a first node of a plurality of nodes of a divided cluster comprising:
   initially waiting for a delay corresponding to a node identifier of the first node;
   asserting an intent to acquire a lock by writing the node identifier of the first node to an X variable and writing the node identifier of the first node to a Y variable where a second node has failed to acquire the lock;
   after asserting the intent to acquire the lock,
      waiting for a third node to acquire the lock where the third node has written to the X variable, and proceeding to perform a first group of actions where the Y variable remains equal to the node identifier of the first node, or where the third node has failed to acquire the lock, where the first group of actions comprises, in order of performance:
         waiting for a fourth node to acquire the lock where the fourth node has written to a Z variable and thereafter writing the node identifier of the first node to the Z variable and proceeding to perform a second group of actions where the fourth node has failed to acquire the lock, where the second group of actions comprises, in order of performance:

writing a value to the Y variable indicating that the first node is acquiring the lock; and, maintaining acquisition of the lock by periodically writing the node identifier of the first node to the Z variable.

2. The method of claim 1, further comprising determining that a node has acquired the lock by calling a test-lock function that returns true where two heartbeats of the node are detected, and that returns false where the two heartbeats of the node are not detected.

3. The method of claim 2, wherein the test-lock function waits for a delay in looking for a second heartbeat of the node after a first heartbeat of the node has been detected.

4. The method of claim 3, wherein the delay is determined as twice a priority of a node calling the test-lock function multiplied by a constant, such that the delay is inversely proportional to the priority of the node calling the test-lock function.

5. The method of claim 1, wherein the node identifier of each node indicates a priority of the node relative to other nodes.

6. The method of claim 1, wherein the method is performed by all of the plurality of nodes.

7. The method of claim 1, wherein the divided cluster is divided into a plurality of groups of nodes, each group of nodes unable to communicate with one another via networking messaging.

8. The method of claim 7, wherein each group of nodes determines at least one node of the group to perform the method.

9. The method of claim 8, wherein at least one node of each group of nodes is determined by a network messaging-based protocol within which the nodes of each group communicate with one another via network messaging.

10. The method of claim 8, wherein at least one node of each group of nodes is determined by a storage-based protocol within which the nodes of each group employ additional variables stored on a storage.

* * * * *